(12) United States Patent
DeClue

(10) Patent No.: US 6,564,793 B2
(45) Date of Patent: May 20, 2003

(54) ROTATING FIREBOX BARBEQUE GRILL

(76) Inventor: Monte B. DeClue, 12439 Fieldstone, Festus, MO (US) 63028

(*) Notice: Subject to any disclaimer, the term of this patent is extended or adjusted under 35 U.S.C. 154(b) by 0 days.

(21) Appl. No.: 09/753,261

(22) Filed: Jan. 2, 2001

(65) Prior Publication Data

US 2002/0083940 A1 Jul. 4, 2002

(51) Int. Cl.⁷ .............................. A47J 37/04; A47J 37/07
(52) U.S. Cl. ................... 126/25 AA; 126/25 R
(58) Field of Search ............................. 126/25 R, 25 A, 126/25

(56) References Cited

U.S. PATENT DOCUMENTS

| | | |
|---|---|---|
| 351,896 A | 11/1886 | Bowman |
| 391,274 A | 10/1888 | Ridgway |
| 773,744 A | 11/1904 | Hough |
| 2,819,667 A | 1/1958 | Victor |
| 3,033,190 A | 5/1962 | Atkinson |
| 3,959,620 A | 5/1976 | Stephen, Jr. |
| 4,382,432 A * | 5/1983 | Lizdas ...................... 126/25 A |
| 4,469,019 A * | 9/1984 | Baer ...................... 126/25 AA |
| 4,572,062 A * | 2/1986 | Widdowson ............... 126/25 A |
| 4,852,476 A * | 8/1989 | Sanchez .................... 126/25 A |
| 5,099,821 A | 3/1992 | Ceravolo |
| 5,515,774 A * | 5/1996 | Swisher et al. ................ 99/340 |
| 5,715,744 A * | 2/1998 | Coutant ........................ 99/419 |
| 5,752,497 A | 5/1998 | Combs et al. |
| 5,758,635 A | 6/1998 | Peterson |
| 5,787,873 A | 8/1998 | Whitehouse |
| 5,996,572 A * | 12/1999 | Hagan .................... 126/25 AA |

FOREIGN PATENT DOCUMENTS

FR 2444438 7/1980

* cited by examiner

*Primary Examiner*—Sara Clarke
(74) *Attorney, Agent, or Firm*—Polster, Lieder, Woodruff & Lucchesi, L.C.

(57) ABSTRACT

A rotating firebox cooking apparatus is disclosed. The rotating firebox may be constructed with a grilling apparatus, or it may be easily retrofitted to an existing conventional grilling apparatus. The firebox of the present invention is located within a chamber having a grill at or near the top of the chamber, and the firebox rotates the heat source within the chamber and underneath the grill, creating radiant and convection energy.

13 Claims, 3 Drawing Sheets

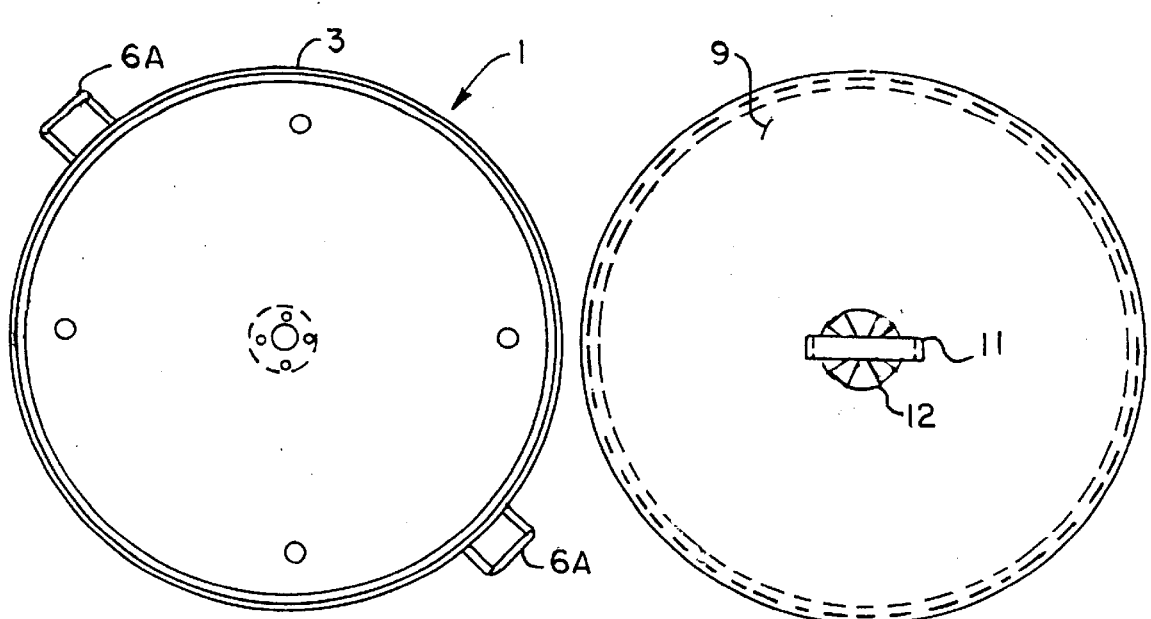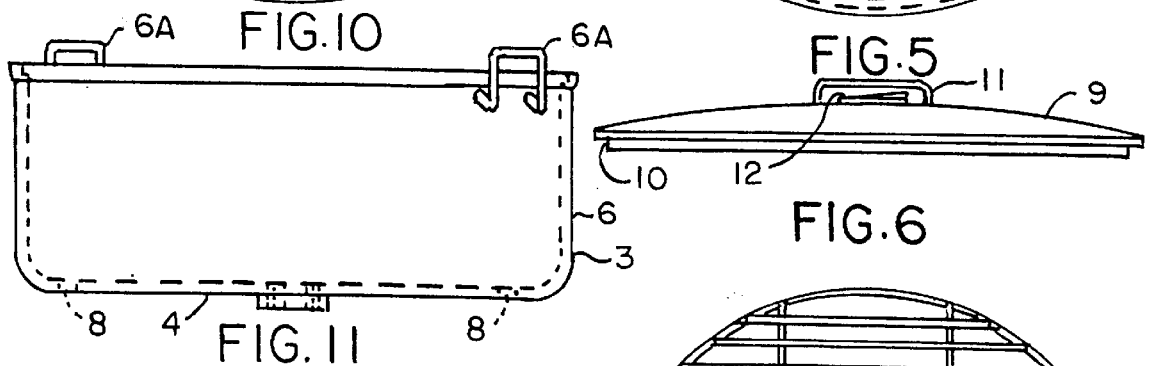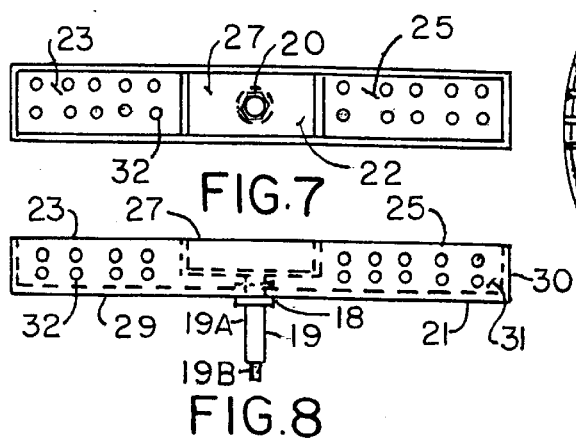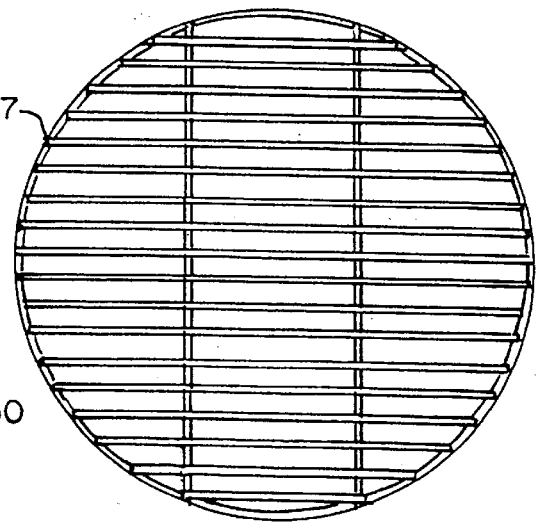

ROTATING FIREBOX BARBEQUE GRILL

BACKGROUND OF THE INVENTION

1. Field of the Invention

The present invention relates to outdoor cooking devices, and more particularly to outdoor cooking grills with a rotating fire element for the even cooking of grilled food using a transversally mounted standard rotisserie motor drive. The present invention allows for uniform cooking of grilled food without constant monitoring.

2. Discussion of the Related Art

Cooking by means of a grill has been and continues to be a popular method of preparing food, especially in summer months when the weather is conducive to outdoor activities. In the typical outdoor grill, the cook places food on a fixed grill surface, and provides a source of heat, which is typically fire. In the standard grill, whether it is charcoal fueled or gas fueled, the source of heat is fixed, that is, no provision is made for the movement of the heat source. This potentially causes uneven cooking of the food to be prepared, unless the cook is vigilant in monitoring the grill and moving the food around the grill frequently to provide uniform cooking of the food. This method of cooking requires both skill and attention and obligates the cook to remain with the food throughout the grilling process.

These problems are due to several factors. First, the fuel used may be a solid combustible material, such as wood chips or charcoal briquettes, a combustible gas, such as propane, electric, or a combination of the above. While grills employing solid fuel are generally less expensive than gas or electric grills, unique problems arise from their use. For instance, the solid fuel may not combust evenly, so that some areas of the grill receive relatively hot areas sometimes known as hot spots, while other areas are relatively cooler.

A second problem common to all known grills is the phenomenon of "flare up." This occurs when fats and oils (which are, after all, largely composed of hydrocarbons) liquefy upon heating and are deposited on the heat source, where these fats and oils ignite. Upon ignition of these fats and oils, an area of increased combustion occurs, potentially charring the food disposed above on the grill. In the event of "flare up," the cook must either partially extinguish the increased flames, or quickly move the food to a new area of the grill that is not currently flaring up. However, since more fats and oils usually drip into the new area, "flare up" will occur again, so that the cook must expend considerable energy in responding to the "flare up" to avoid burned food.

Several attempts to ameliorate these problems have been proposed. These solutions fall broadly into three groups: Providing a movable grill surface to automatically move the food around the fire source; providing a modified intake of air and fuel mixture for altering the rate at which the fuel burns; and providing a mechanism for raising and lowering the fuel source to compensate for varying rates of fuel consumption through its combustion.

Methods and apparatuses for turning the grill surface and thereby rotating the food in relation to the heat source are known, such as those described in U.S. Pat. No. 5,787,873 issued on Aug. 4, 1998 to Whitehouse; U.S. Pat. No. 3,033,190 issued on May 8, 1962 to Atkinson; U.S. Pat. No. 2,819,667 issued on Jan. 14, 1958 to Victor; and French Patent No. 2,444,438 issued on Dec. 21, 1978 to Tier. While these grills aid in the uniformity of cooking by compensating for hot spots, they do not address the problems of "flare up" or efficient fuel combustion.

Other methods utilize a modified fuel or fuel mixture to ameliorate the phenomenon of uneven combustion of solid fuel. For example, U.S. Pat. No. 5,752,497, issued on May 19, 1998 to Combs et al. discloses a cooking grill with an air intake, a flue gas outlet, and a dampening mechanism for modifying the air and fuel ratios to achieve a desired cooking temperature at the grill surface. Several patents, including U.S. Pat. No. 773,744 issued on Nov. 1, 1904 to Hough; U.S. Pat. No. 391,274 issued on Oct. 16, 1888 to Ridgway; and U.S. Pat. No. 351,896 issued on Nov. 2, 1886 to Bowman disclose a furnace with a rotatable grate upon which fuel is disposed. In these examples, the grate is rotated so that the fuel is brought into contact with a fixed portion of the furnace, either a wall or a separate set of projections to mechanically agitate the fuel, and dispose of ashes and spent cinders of coal known as "clinkers" by mechanically agitating these "clinkers" through the grate, and thereby increasing the proportion of unspent fuel available for combustion. In U.S. Pat. No. 3,959,620, issued on May 25, 1976 to Stephen, Jr., electric coils provide the source of heat to produce a more uniform heat source. Additionally, it is well known to use a fuel mixture of propane, natural gasses (predominantly alkanes or alkenes) and air as a combustible nature for providing a source of heat. These solutions do not effectively control "flare up," nor do they adequately provide solutions to uneven heating.

Finally, other solutions provide for raising and lowering either the grill surface or the heat source to help compensate for "flare up" and uneven combustion. In these solutions, the cook modifies the vertical distance of the heat source in relation to the grill in response to variations in combustion, such that when the heat source is producing relatively more energy, the heat source is moved away relative to the grill, and when the heat source is producing relatively less energy, the heat source is moved in closer relation to the grill. Examples of these solutions include U.S. Pat. No. 5,758,635 issued on Jun. 2, 1998 to Peterson, and U.S. Pat. No. 5,099,821 issued on Mar. 31, 1992 to Ceravolo.

None of the above examples adequately and simultaneously solves the problems identified with uneven combustion, "flare up" and constant monitoring. Therefore, there is a need for a cooking apparatus that simultaneously solves all of the above problems,

BRIEF SUMMARY OF THE INVENTION

According to the present invention, there is disclosed a rotating firebox cooking apparatus. The rotating firebox may be constructed with a grilling apparatus, or it may be easily retrofitted to an existing conventional grilling apparatus. The firebox of the present invention is located within a chamber having a grill at or near the top of the chamber, and the firebox rotates the heat source within the chamber and underneath the grill, creating radiant and convection energy.

BRIEF DESCRIPTION OF THE SEVERAL VIEWS OF THE DRAWINGS

The objects of the invention are achieved as set forth in the illustrative embodiments shown in the drawings that form a part of the specification.

FIG. 5 is a top plan view of a lid for a cooking apparatus of the present invention;

FIG. 6 is a side elevational view of a lid for a cooking apparatus of the present invention;

FIG. 7 is a top plan view of a rotating firebox assembly of the present invention;

FIG. 8 is a side elevational view of a rotating firebox assembly of the present invention;

FIG. 9 is a top plan view of a grill surface of a cooking apparatus of the present invention;

FIG. 10 is a top plan view of a bowl of a cooking apparatus of the present invention; and FIG. 11 is a side elevational view in cross section of a bowl of a cooking apparatus of the present invention.

Corresponding reference characters indicate corresponding parts throughout the several views of the drawings.

DETAILED DESCRIPTION OF INVENTION

Figure 1:
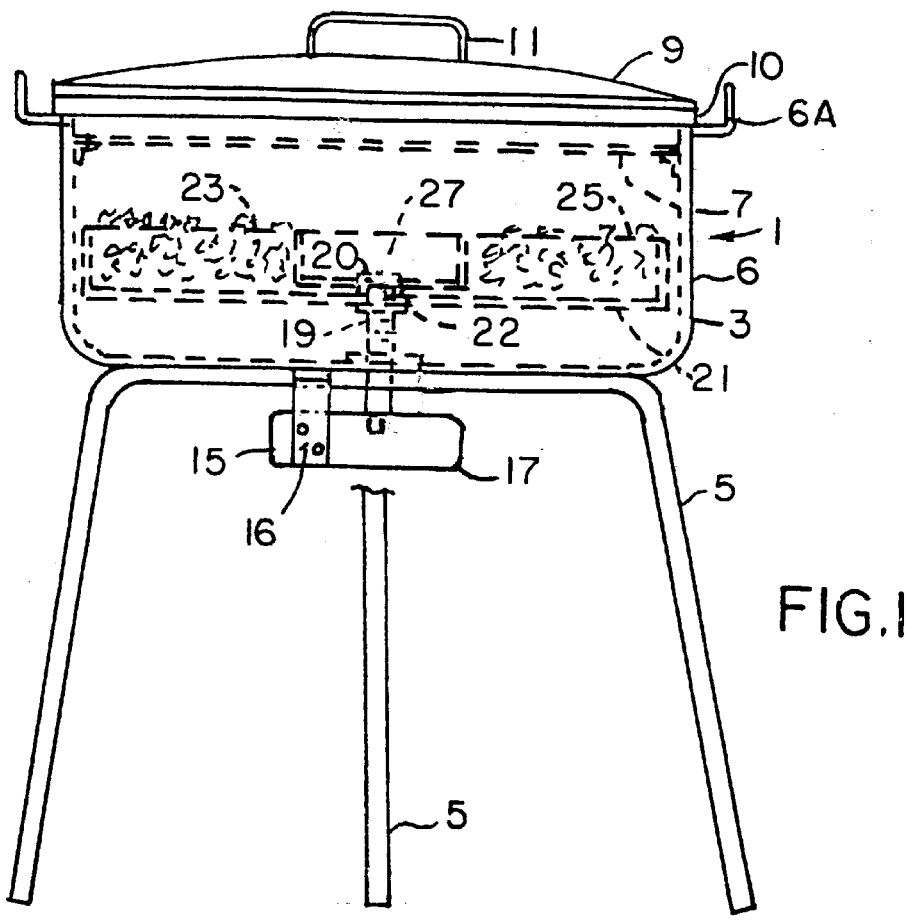
FIG. 1 is a side elevational view in cross section of a cooking apparatus of the present invention.
Figure 2:
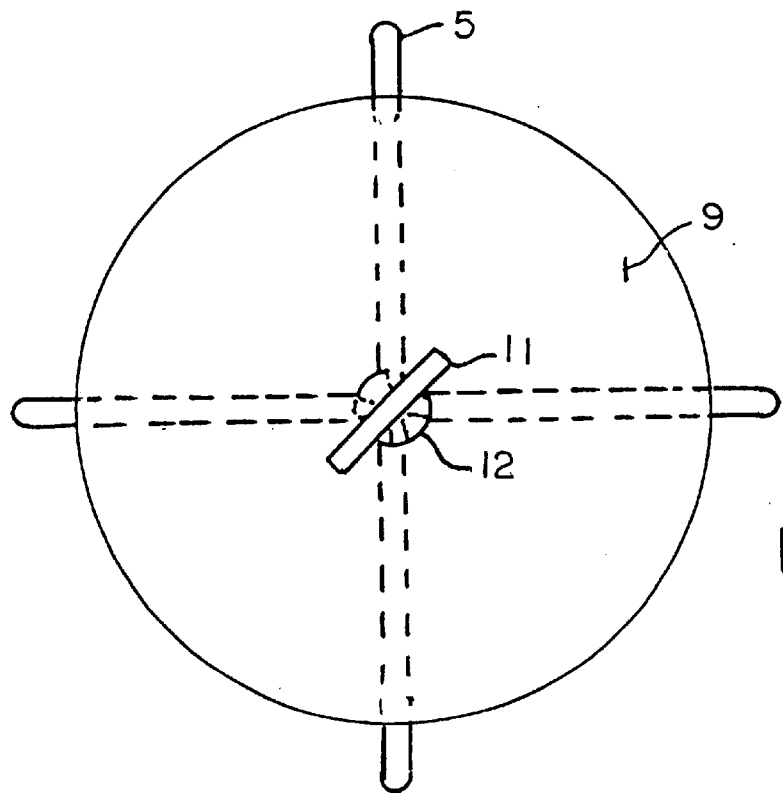
FIG. 2 is a top plan view of a cooking apparatus of the present invention.

Referring to the drawings, FIG. 1 shows a rotating firebox grill of the preset invention generally at 1. Referring to FIGS. 1, 3, 10, and 11, the rotating firebox grill 1 comprises a chamber portion 3 having a chamber bottom 4 and chamber walls 6. In the preferred embodiment of the present invention, a plurality of legs 5 are disposed under the chamber 3 and are operatively engaged to the chamber 3. The legs 5 act to stabilize the chamber 3 and provide space between the chamber 3 and the ground or other surface upon which the rotating firebox grill is placed for use. In the preferred embodiment of the present invention, one or more ventilation spaces 8 are provided in the bottom portion 4 of the chamber 3, to allow air flow within the chamber 3. The chamber 3 is preferably fabricated from a heat resistant material, such as a metal or metal alloy. More preferably, the chamber 3 is made of ceramic-coated steel. Preferably, chamber 3 includes handles 6A attached to the walls 6, to aid in transportation of the rotating firebox grill.

Referring now to FIGS. 1 and 9, near or at the top of chamber 3 is a grill surface 7. The grill surface 7 is suspended over the bottom portion 4 of the chamber 3 using tabs or an integrally formed shoulder near of at the top of the chamber walls 6, or in any other conventional way. As can best be seen in FIG. 9, the grill surface 7 is a conventional grill.

Referring now to FIGS. 1, 2, 5, and 6, in the preferred embodiment of the present invention, a lid 9 is adapted to fit over the walls 6 of the chamber 3. The lid 9 is conventional, and preferably has an integrally formed interior rim 10 disposed on its underside, for communication with the chamber walls 6 of the chamber 3. The lid 7 also includes a lid handle 11, for installation of the lid 7 to the chamber 3 and removal of the lid 7 from the chamber 3. In the preferred embodiment of the present invention, the lid 7 further has an adjustable vent 12 near the top of the lid 7. The adjustable vent 12 is conventional.

In a conventional solid fuel burning grill, the chamber forms at least a part of the firebox, and contains the solid fuel. The solid fuel in a conventional grill remains stationary, unless the cook manually stirs the coals with a stick or similar tool.

Figure 3:
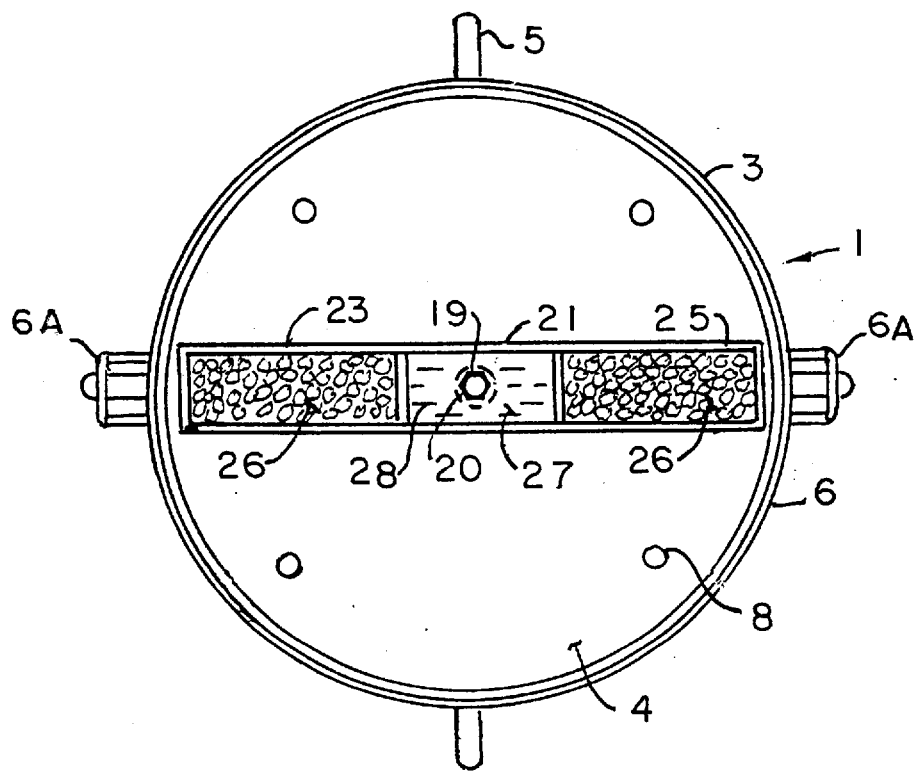
FIG. 3 is a top plan view of a cooking apparatus of the present invention with the lid removed.
Figure 4:
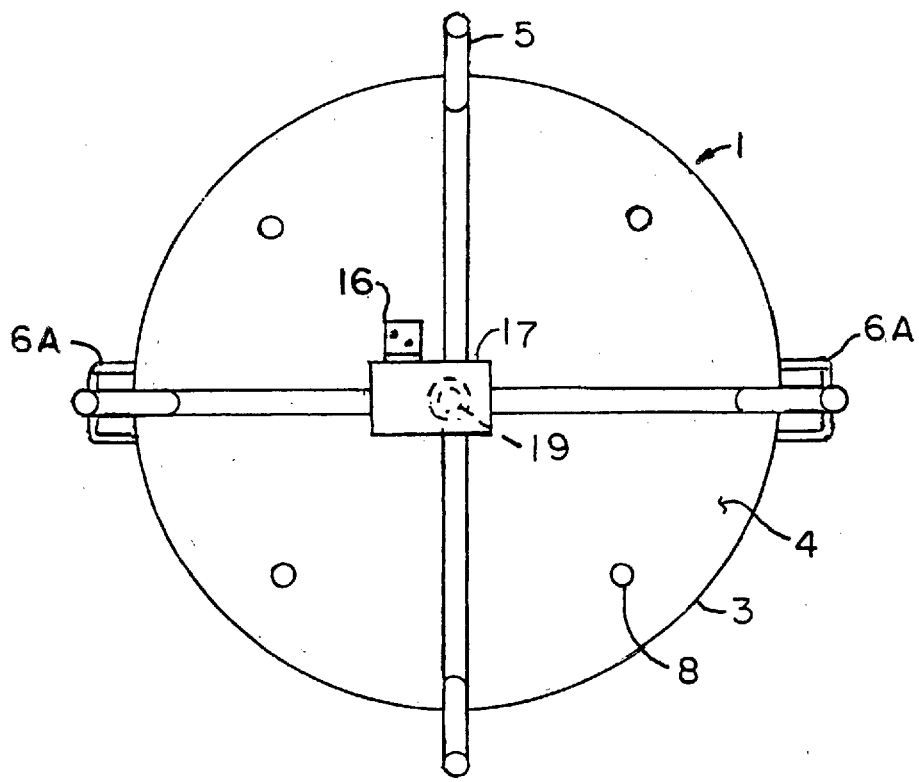
FIG. 4 is a bottom plan view of a cooking apparatus of the present invention.

However, in the present invention, referring now to FIGS. 1, 3 and 4, a rotary assembly 15 rotates a separate firebox 21, which holds the solid file 26. In the preferred embodiment of the present invention, the rotary assembly 15 comprises a motor 17, a generally cylindrical shaft 19, and a firebox 21. A bracket 16 preferably holds the motor 17 in place, to prevent unwanted movement of the motor 17. The motor 17 is preferably a standard electric rotisserie motor, and may be battery operated (direct current) or powered with alternating current. The shaft 19 has an upper end 19A and a lower end 19B. Upper end 19A of shaft 19 is preferably threaded, and adapted to mate with an internally threaded nut 20. The upper end 19A of shaft 19 further has an annular ring 18 formed therein, which forms a shoulder. The lower end 19B of shaft 19, a flattened portion is adapted to mate with a female connection within the motor 17 (not shown).

Referring now to FIGS. 1, 3, 7, and 8, the firebox 21 is preferably generally rectangular in shape. The firebox 21 has a bottom surface 29 and sides 30. Near the center of the bottom surface 29 of the firebox 21 an opening 22 is adapted to receive the upper end 19A of shaft 19, until the shoulder formed by annular ring 18 abuts the bottom surface 29 of firebox 21. The nut 20 is secured to the threaded upper end 19A of shaft 19, forming a tight fit to the lower surface 29 of the firebox 21.

Referring to FIGS. 1, 3, 7 and 8, in the preferred embodiment of the present invention, a central cup 27 is formed in the firebox 21. The central cup 27 may contain water 28, for example, to provide greater humidity that is sometimes desirable when cooking various foods. The central cup 27 defines a left side 23 and a right side 25 in the firebox 21. As can best be seen in FIG. 3, the solid fuel 26 resides in the left side 23 and the right side 25 of the firebox 21. The solid fuel 26 may be charcoal, charcoal briquettes, wood, or other effective fuel.

Referring to FIGS. 7 and 8, in the preferred embodiment of the present invention, a plurality of ventilation spaces 32 are formed in the bottom surface 29 of firebox 21. Likewise, a plurality of ventilation spaces 31 are formed in the sides 30 of the firebox 21. The ventilation spaces 31 and 32 act to provide additional air to the solid fuel 26.

Optionally, the rotation assembly 15 may be added to a conventional cooking grill. This may require creating or enlarging a hole located within the chamber of the conventional grill, to accommodate the shaft 19 of the rotation assembly 15, As different sizes of chambers are currently manufactured in conventional cooking grills, it is contemplated that the size of the firebox 21 would be made in correspondingly different sizes as well. The rotation assembly in this embodiment is analogous to that described in the preferred embodiment. The rotary assembly 15 comprises a motor 17, a generally cylindrical shaft 19, and a firebox 21. A bracket 16 preferably is provided, to hold the motor 17 in place, and to prevent unwanted movement of the motor 17. The motor 16 is preferably a standard electric rotisserie motor, and may be battery operated (direct current) or powered with alternating current. The shaft 19 has an upper end 19A and a lower end 19B. Upper end 19A of shaft 19 is preferably threaded, and adapted to mate with an internally threaded nut 20. The upper end 19A of shaft 19 further has an annular ring 18 formed therein, which forms a shoulder. The lower end 19B of shaft 19, a flattened portion is adapted to mate with a female connection within the motor 16 (not shown).

In operation, the cook will first add solid fuel 26 to the firebox 21, as well as water 28 to the central cup 27, if desired. The cook then ignites the solid fuel 26. The motor 16 is engaged, causing the firebox 21 to spin about its axis, with the combusting fuel spinning with it. It is preferred that no part of the firebox 21 touches the chamber 3 of the cooking apparatus 1. The grill 7 is affixed in place, and food is put on the grill 7. It has been found that the rotating firebox cooking apparatus described herein produces an even heat source, and provides both radiant and convection heat for uniform cooking of food. Very little monitoring is required on the cook's part, as compared with other methods of grilling.

Numerous variations will occur to those skilled in the art in light of the foregoing disclosure. For example, the grill chamber, while shown as generally cylindrical, may be hemispherical, frustoconical, or any other advantageous shape. The firebox may be shaped other than the generally rectangular shape shown Other drive connections between the rotation apparatus and the firebox may be employed, such as gears or belts, for example. When using alternative drive connections, the firebox may be adapted to orbit the interior of the grill chamber rather than spinning about the axis of a shaft, and this orbit may be eccentric, if desired. While the firebox is described in the preferred embodiment as having ventilation holes, the ventilation spaces may be any other shape, and may be completely absent.

Having thus described the invention, what is claimed and desired to be secured by letters patent is:

1. A cooking apparatus comprising:
   an outer chamber having a bottom and sides;
   a grill surface, said grill surface positioned above said bottom of said outer chamber;
   a firebox, said firebox having a bottom portion and a wall portion, and said firebox disposed inside said chamber and below said grill surface;
   a shaft having a top portion and a bottom portion, said shaft operatively connected to said firebox at said top portion of said shaft; and
   a rotation apparatus operatively connected to said bottom portion of said shaft, said rotation apparatus adapted to rotate said firebox through 360° of rotation about said shaft.

2. The cooking apparatus of claim 1 wherein said rotation apparatus comprises an electric motor operatively connected to said shaft.

3. The cooking apparatus of claim 2 wherein said electric motor utilizes alternating current.

4. The cooking apparatus of claim 1 wherein said firebox is generally rectangular.

5. The cooking apparatus of claim 1 wherein said firebox has a plurality of ventilation openings disposed in said wall portion.

6. The cooking apparatus of claim 1 wherein said firebox has a plurality of ventilation openings in said bottom portion.

7. The cooking apparatus of claim 6 wherein said firebox has a plurality of ventilation openings disposed in said wall portion.

8. The cooking apparatus of claim 7 wherein said ventilation openings are generally circular.

9. The cooking apparatus of claim 1 further including a plurality of legs operatively attached to said chamber.

10. The cooking apparatus of claim 1 wherein said firebox is adapted to contain solid, combustible fuel.

11. A grill comprising:
    a chamber;
    a grill surface suspended by the chamber;
    a firebox disposed below the grill surface and within the chamber; and
    wherein the firebox is adapted for continuous rotation within the chamber about an axis generally perpendicular to the grill surface.

12. The grill of claim 11 wherein the firebox is attached to a shaft extending through the bottom of the chamber and the shaft caused to rotate in order to provide rotation of the firebox.

13. The grill of claim 12 wherein an electric motor is attached to the end of the shaft in order to provide rotation of the shaft.

* * * * *

UNITED STATES PATENT AND TRADEMARK OFFICE
CERTIFICATE OF CORRECTION

PATENT NO.    : 6,564,793 B2
DATED         : May 20, 2003
INVENTOR(S)   : Monte B. DeClue It is certified that error appears in the above-identified patent and that said Letters Patent is hereby corrected as shown below:

Column 1,
Line 64, replace "Tier" with -- Garnier --

Column 2,
Line 24, replace "nature" with -- mixture --

Column 3,
Line 66, replace "file" with -- fuel --

Column 5,
Line 15, replace "shown Other" with -- shown. Other --

Column 6,
Line 18, replace "openings are generally circular." with -- openings in the wall portion and the bottom portion are generally circular. --

Signed and Sealed this

Second Day of September, 2003

JAMES E. ROGAN
*Director of the United States Patent and Trademark Office*